United States Patent [19]
Domino et al.

[11] Patent Number: 5,697,201
[45] Date of Patent: Dec. 16, 1997

[54] CARTONER CLEAN OUT METHOD

[75] Inventors: Bruce D. Domino, Nisswa; Richard E. Balder, Brainerd, both of Minn.

[73] Assignee: Riverwood International Corporation, Atlanta, Ga.

[21] Appl. No.: 807,832

[22] Filed: Feb. 27, 1997

Related U.S. Application Data

[62] Division of Ser. No. 238,167, May 4, 1994, Pat. No. 5,606,848.

[51] Int. Cl.$^6$ ............................................. B65B 35/54
[52] U.S. Cl. .................................................. 53/448; 53/473
[58] Field of Search ............................. 53/167, 393, 251, 53/252, 534, 543, 493, 495, 496, 497, 566, 448, 458, 467, 473; 198/418.7, 419.2, 419.3

[56] References Cited

U.S. PATENT DOCUMENTS

| | | | |
|---|---|---|---|
| 338,235 | 3/1886 | Mullins | 16/1 R |
| 365,611 | 6/1887 | Count | 16/1 R |
| 841,124 | 1/1907 | Cruver | 16/1 R |
| 2,885,841 | 5/1959 | Currie et al. | 53/566 X |
| 3,300,947 | 1/1967 | Fahrenbach | 53/566 X |
| 3,778,959 | 12/1973 | Langen et al. | 53/534 X |
| 3,805,476 | 4/1974 | Kawamura et al. | 53/534 X |
| 3,805,478 | 4/1974 | Stohqunist et al. | 53/251 X |
| 3,956,868 | 5/1976 | Ganz et al. | 53/566 X |
| 4,642,967 | 2/1987 | Culpepper | 53/574 X |
| 4,982,551 | 1/1991 | Nigrelli | 53/266 X |

FOREIGN PATENT DOCUMENTS

| | | | |
|---|---|---|---|
| 0371637 | 6/1990 | European Pat. Off. | |
| 552981 | 7/1993 | European Pat. Off. | 53/543 |

OTHER PUBLICATIONS

Riverwood International Corporation, Twin Stack–Operators Manual, Dec. 1, 1993, pp. 7–6 and 7–7.
Riverwood International Corporation, Operator Controls Section, Version 1.1, pp. 6–28 and 6–29.

*Primary Examiner*—Daniel Moon
*Attorney, Agent, or Firm*—Joel D. Skinner, Jr.; Steve M. McLary

[57] ABSTRACT

A method for halting the function of a high speed packaging machine of the type having a conveyor based article infeed line conveying articles to a flight bar based selection line. The method is useful for performing a clean out procedure used during maintenance, and product or packaging change over. The method comprises the steps of terminating the operation of the infeed line conveyor at a predetermined position; placing an article follower behind a terminal article in each input lane; activating the operation of the infeed line conveyor whereby the articles in each input lane are conveyed to the selection line; and halting the conveyance of the article follower in the input lane prior to the selection line. An article follower and follower system are also disclosed.

5 Claims, 7 Drawing Sheets

CARTONER CLEAN OUT METHOD

CROSS-REFERENCE TO RELATED APPLICATIONS, IF ANY

This application is a division of application Ser. No. 08/238,167, filed May 4, 1994, now U.S. Pat. No. 5,606,848.

STATEMENT REGARDING FEDERALLY SPONSORED RESEARCH OR DEVELOPMENT

Not applicable.

REFERENCE TO A MICROFICHE APPENDIX, IF ANY

Not Applicable.

BACKGROUND OF THE INVENTION

1. Field of the Invention

This invention relates to packaging apparatus and methods. Particularly, this invention relates to a system and method for use at the infeed end of a cartoning machine to control the infeed of articles such as beverage cans thereinto during a stoppage or shutoff procedure. The infeed control system and method of the present invention simplifies and speeds the stoppage or shutdown of such packaging machines.

2. Background Information

Various machines have been utilized to package a variety of products. Although many of these machines operate continuously and at very high speeds they must all be periodically shut down for routine maintenance and for changes in the processed product or packaging. Shut down and clean out is typically performed by hand and is a relatively slow process. Manual shut down procedures significantly reduce the overall speed and productivity of the machine over the course of its operative life. And, because such procedures are labor intensive, they increase the overall cost of operating the machine.

The typical packaging machine utilizes a selection or metering mechanism to process an ungrouped stream or line of infeed articles into groups of articles having a predetermined size and orientation. Flight bars are often used in such mechanisms. Many of these machines rely on pressure or surge from articles located upstream on the article infeed line to maintain proper flow of articles into the selection mechanism. During a shut down or clean out procedure, the input of articles is terminated and infeed surge pressure is lost. Once back pressure is lost, the terminal article or group of articles will likely not be processed properly, and malformed or incompletely formed groups can result. In the case of selection mechanisms utilizing flight bars, spearing of articles such as cans may occur. Spearing results in exploding cans which is dangerous and costly to clean up. The terminal group of articles in the infeed line must therefore be removed manually to avoid these problems. Manual removal of the infeed cans leads to a requirement for manual manipulation of for example intermediate formed groups and packaging media located downstream on and sometimes deep within the packaging machine. On large high speed machines the net loss of processing time due to manual clean out procedures is significant. Manual procedures performed on large high speed equipment also poses safety problems.

Insofar as is known, no apparatus or method has been developed or proposed which has solved the problem of accomplishing machine shut down and clean out quickly, easily, safely and automatically. In view of the limitations and shortcomings of prior art methods and apparatus, it is an object of this invention to provide a system and method for use with a continuous high speed packaging machine which minimize shut down and clean out time. A particular object of this invention is to provide a system and method which are useable with packaging machines that rely on pressure from upstream articles to infeed articles into a selection or metering mechanism or section. A final object of this invention is to provide a system and method which are useable with a variety of packaging machine designs and with a variety of article and article group types and sizes.

BRIEF SUMMARY OF THE INVENTION

The present invention provides an article follower for use in controlling the input of articles to a packaging machine of the type having at least one conveyor based infeed line, having at least one input lane, which conveys articles to a flight bar based selection line, the follower being placed in the infeed line behind at least one article in an input lane, the article follower comprising a body having a mass capable of loading at least one article from the infeed line on to the selection line, the follower further having a configuration which enables the body to be reliably conveyed in the input lane.

The invention further provides a clean out system for use in controlling the input of articles to a packaging machine during a clean out procedure, the packaging machine being of a type having at least one conveyor based infeed line having at least one input lane, and a flight bar based selection line, the system comprising a plurality of followers which are placed on the infeed line in the respective input lanes behind a terminal article therein, each follower having a mass capable of loading at least one article from the input lane on to the selection line, each follower further having a configuration which enables it to be conveyed in the input lane.

Finally, the invention provides a method of terminating the operation of a packaging machine of the type having a conveyor based article infeed line, having at least one input lane, which conveys articles to a flight bar based selection line, comprising the step of placing a load on a predetermined article traveling in the article input lane at a predetermined point. In the preferred embodiment, the method further comprises the steps of:

(a) terminating the operation of the infeed line conveyor at a predetermined position;

(b) placing an article follower behind a terminal article in each input lane;

(c) activating the operation of the infeed line conveyor whereby the articles in each input lane are conveyed to the selection line; and (d) halting the conveyance of the article follower in the input lane prior to the selection line, whereby the article follower loads the terminal article and ensures that it is conveyed to the selection line.

The benefits of this invention will become clear from the following description by reference to the drawings.

DETAILED DESCRIPTION

The apparatus and method of the present invention are for controlling the input of articles at the infeed end of a high speed, continuous motion packaging machine 10 during a clean out procedure. The apparatus and method improve the shut down and clean out procedures for the machine 10, used for example during a product change over. The method and apparatus provide a simpler, quicker and safer shut down and clean out. The apparatus and/or method may be modified, consistent with the basic teachings of the invention to provide reliable clean out of articles or products of varying types, sizes and quantities. In the example embodiment, the machine 10 loads standard twelve ounce beverage cans into 24(12/12) pack stacked paperboard packages or carriers However, the apparatus and method of this invention may also be used with many other types of packaging machines to process a variety of types and sizes of articles, article groups and packages. It is specifically within the purview of this invention that the apparatus and method be useable to control the infeed of articles in a packaging machine that processes single level groups, namely the Continuous Motion Cartoner Assembly disclosed in U.S. Pat. No. 5,241,806, owned by Applicants' assignee, which is incorporated by reference herein.

Figures 11, 12:
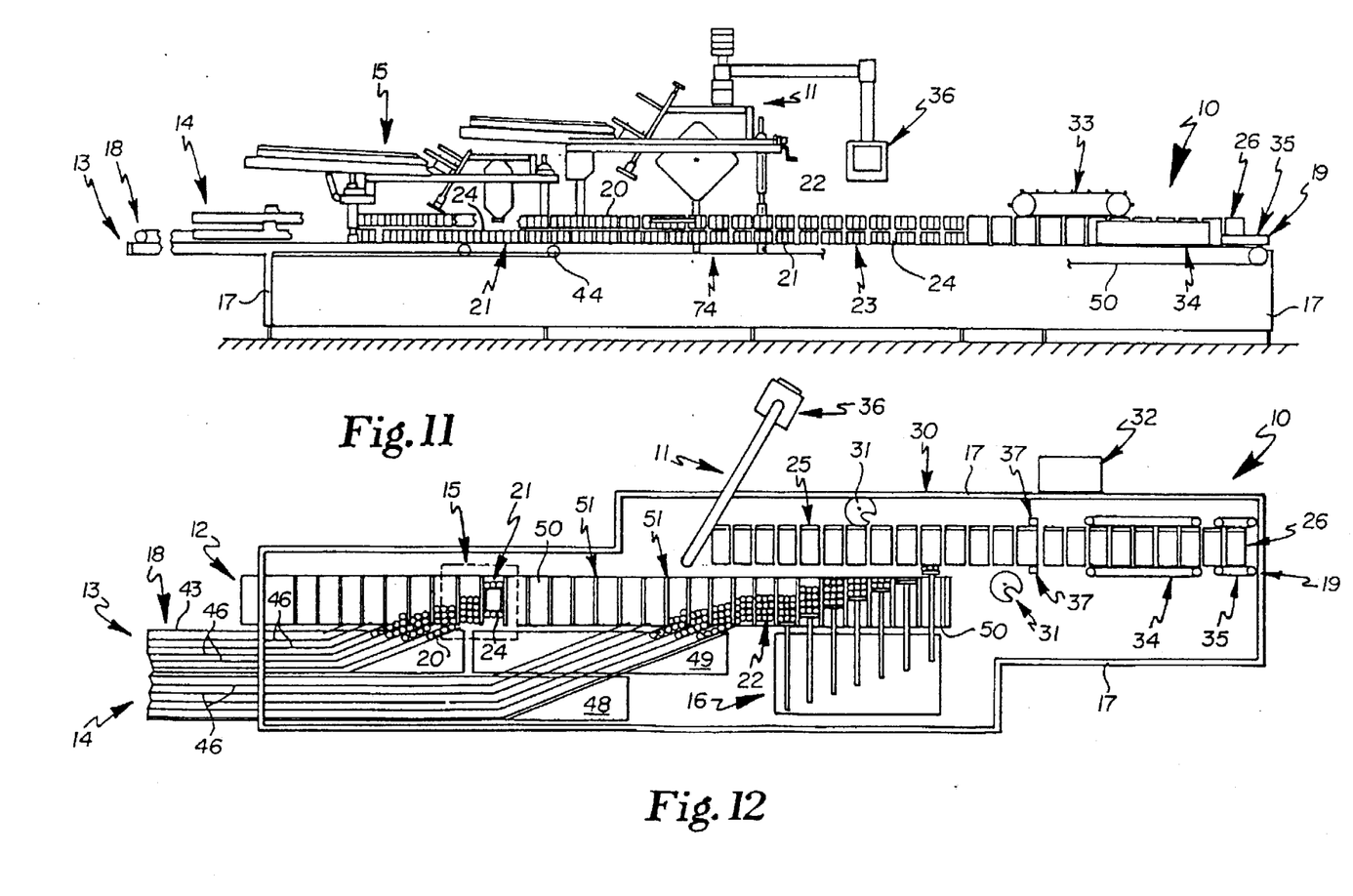
FIG. 11 is a side view of a packaging machine which utilizes the clean out system of the present invention.
FIG. 12 is a plan view of the machine shown in FIG. 11.

Referring to FIGS. 11 and 12, the cartoner 10 upon which the apparatus and method of this invention are utilized generally comprises a carton supply and transport mechanism 11, an article group selection and transport mechanism 12, a pair of article supply mechanisms 13 and 14, a divider sheet placement mechanism 15, and a cross loading mechanism 16. These mechanisms are shown to be supported by a unitary frame structure 17. The movement of each mechanism is synchronized with one another, for example by a common drive and/or gearing means controlled from an electronic control station 36. Ancillary packaging mechanisms such as flap folders 30 and 31, glue stations 37 and 32, and top and side compression mechanisms 33, 34 and 35 are shown disposed downstream to form the completed package 26.

The carton supply mechanism 11 is shown to be disposed proximate an input end 18 of the assembly 10. Carton blanks 25 are setup and transported in a linear fashion to an output end 19 of the apparatus 10. The article supply mechanisms 13 and 14 are also shown to be disposed at the input end 18 of the apparatus 10. Each article supply mechanism 13 and 14 merges, at a preferred angle of 22.5 degrees, with the article group selection transport mechanism 12 to supply streams of product or articles 20 to two separate positions along the article group selection and transport mechanism 12 and to select individual articles 20, via flight bars, into predetermined stacked article groups 21 and 22 on the mechanism 12. The stacking function of the device 10 is accomplished by forming a first group 21 at a low level, placing a separator or divider sheet 24 on the lower group 21 via the divider sheet placement mechanism 15, and then simultaneously forming a second group 22 downstream at a higher level and allowing the upper group 22 to slide across the divider sheet 24 by the action of the flight bars of the article group selecting mechanism 12. Merged or combined article groups 23 are transported downstream, each group 23 being aligned with a carton 25 traveling on the carton supply and transport mechanism 11 for loading by the crossloader 16.

Referring also to FIGS. 13–16, the first (low) and second (high) article supply mechanisms 13 and 14 provide a plurality of input individual articles 20 to the apparatus 10 at respective first and second levels or heights and at first and second points along the longitudinally oriented article group selection and transport mechanism 12. The mechanisms 13 and 14 each comprise a conveyor 43 or 48/49 disposed about a drive and idler sprocket/shaft assemblies(not shown). Articles 20 transported on the top, forward run of the conveyors are separated into a plurality of single file paths by lane separators 46. The lane separators 46 are preferably upstanding plates, alteratively rails, of a height sufficient to guide the flow of one or more containers 20 on the conveyor 43, and which are suspended above the conveyor 43. The lane separators 46 form product conveyance lanes which angle towards the article group selection and conveyance mechanism 12. Each lane separator 46 has a terminal portion 47 of a predetermined length, such that it extends a predetermined distance into the path of the article group selection and transport mechanism 12. Each terminal portion 47 is constructed such that it allows longitudinally transported flight structures 51 (described further below) of the article group selection and transport mechanism 12 to pass through the angled conveyance lanes. As the flight bars 51 mesh with the lane separator end portions 47, they engage articles 20 disposed in lanes and rake them onto the longitudinal conveyance path of the mechanism 12 and between adjacent flight bars 51.

The article group selection and transport mechanism 12 generally comprises a conveyor 50, a plurality of flight bar assemblies 51 fixed to and longitudinally transported on the conveyor 50, and a plurality of slide plates 52, which are disposed on the conveyor 50 between the spaced flight bars 51. The conveyor 50 runs at a predetermined speed for normal operation and preferably at a lower speed for clean out. As is best shown in FIGS. 13–16, the flight bar assemblies 51 are each have an angled front end 53. The front end 53 angles inwardly from its leading edge to its trailing edge to enable the flight bars 51 to select individual articles 20 disposed in the article infeed lanes and to separate them from the closely spaced nearest upstream article 20. A pair of fixed slide plates 54 and 55 are connected to each flight bar 51 assembly. Both the flight bars 51 and the slide plates 54 and 55 are connected to the flight chains. The slide plates 54 and 55 are thin, flat structures with a low friction top surface which support the lower article groups 21 and further permit sliding movement thereon. Additionally, slotted slide plates 56 are disposed between adjacent flight bar assemblies 51.

Several key principles exist with respect to the functionality of the apparatus 10, and particularly with respect to the infeed of cans 20 and their selection from the infeed line 13 by the flight bars 51. Cans 20 advance toward the article selection and transport conveyor 12 by force supplied by the underlying conveyor 43 of the infeed line 13. Cans 20 advance across the proximal edge of the deadplate 57 under pressure from the upstream cans located on the conveyor 43. Thereafter, they are conveyed across the dead plate 57 and over its distal edge under the control of the flight bars 51. The leading edges of the flight bar ends 53 mesh with and pass through the slotted lane ends 47, and rake a predetermined number of cans 20, in this example three, therefrom. Cans 20 located immediately upstream of the raked or selected cans follow the trailing edge of the flight bar ends 53 under pressure from the cans 20 located upstream therefrom until they are in a position to be raked by the leading edge of the next upstream flight bar end 53. Once the apparatus 10 is primed with at least one complete product group 21 downstream of the raking zone, and with product groups in intermediate phases of assembly, and with a full supply of infeed cans 20 in each active infeed lane, the article selection and transport mechanism 12 will continuously form and transport completed groups 21.

Referring to FIGS. 1 and 13–16, the method of controlling the infeed of products into the packaging machine 10 to effect a clean out with minimal personnel involves the use of a set of followers 60 which are placed by an operator in the infeed lanes 94 at predetermined positions and at a predetermined time. The followers 60 provide sufficient force or load on the downstream cans 20 such that all of the cans on the infeed lines 13 and 14 are selected and transported onto the article group selection and transport line 12, even in the absence of the normally present large group of upstream cans. The number of followers 60 used depends upon the number of active infeed lanes 94. In the exemplary embodiment, there are four active lanes 94 a–d in which cans 20 are being conveyed. The two remaining lanes are blocked off upstream.

Figures 1, 2, 7, 17:
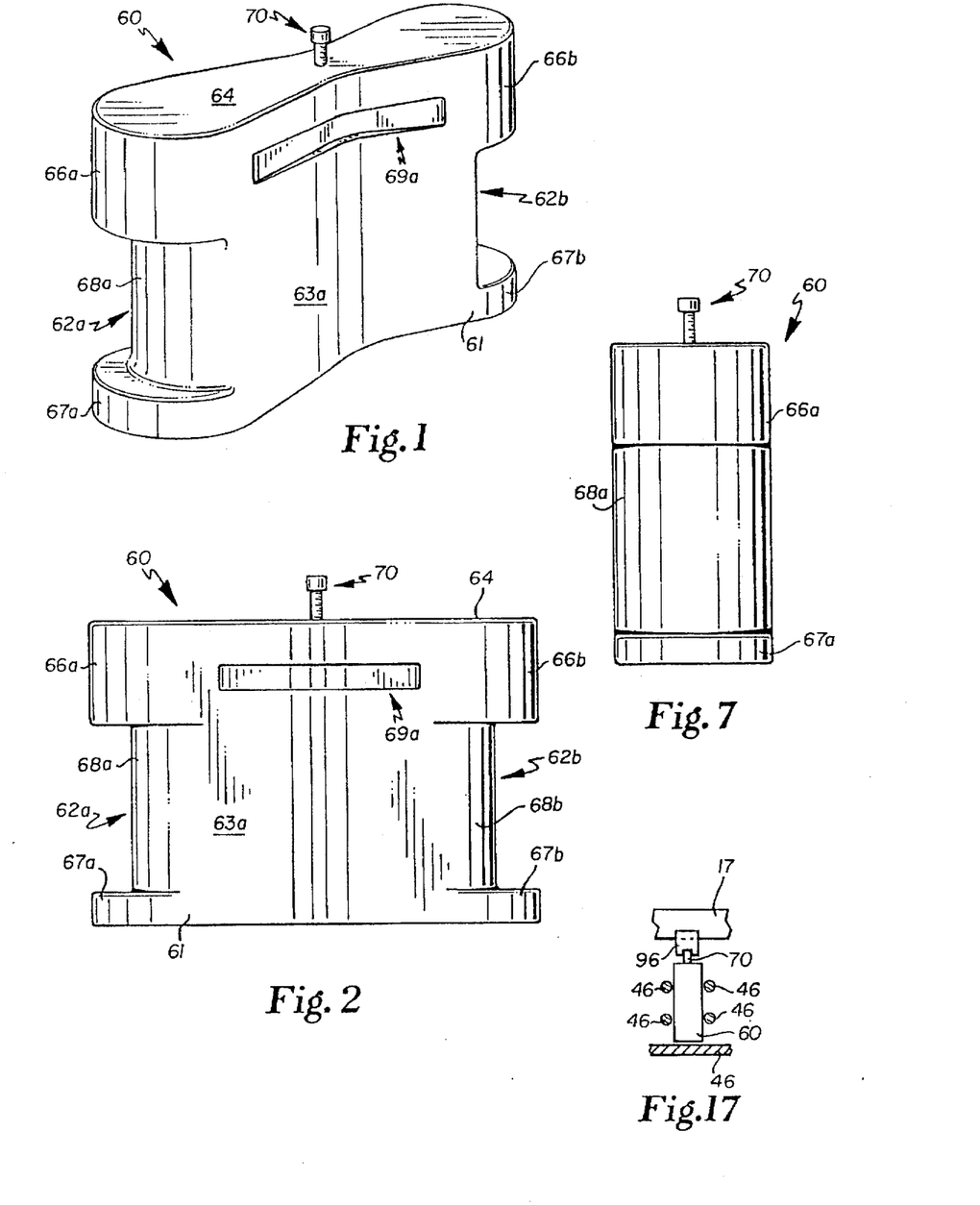
FIG. 1 is a perspective view of a follower unit of the cartoner clean out system of the present invention.
FIG. 2 is a side view of the follower.
FIG. 7 is an end view of the follower.
FIG. 17 is an end view of a follower stop disposed above an infeed lane.
Figure 3:
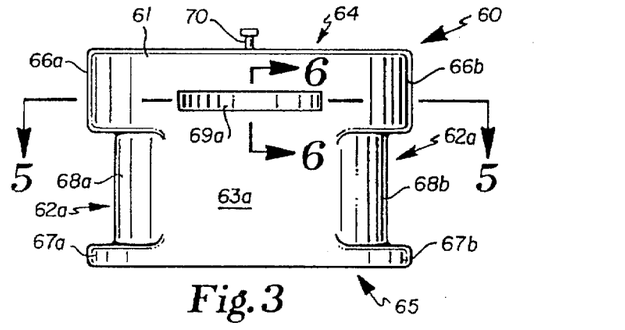
FIG. 3 is an additional side view of the preferred embodiment of the follower.

Each follower 60 is substantially similar, and preferably identical so that the operator can easily and quickly place them into the individual lanes of the infeed line or lines. Additionally, the followers 60 are bilaterally symmetrical so that they may be placed either forward or backwards into the lanes. Each follower 60 is constructed of a solid, preferably metallic substance such as stainless steel or aluminum alloy. The follower 60 may be assembled out of a unitary piece of cast material or out of separable machined segments which are fastened together. The follower 60 must be of a minimum weight such that, when it is conveyed on top of the infeed conveyor 43, it will provide the sufficient force to move all of the downstream cans 20, including the last or terminal can 95 in the lane, into position for selection by a flight bar 51. The force provided by the follower 60 prevents slippage of cans 20 over the conveyor 43 and gap formation between the cans aligned in each lane 94. The maximum weight should not be beyond a weight whereby the follower 60 would be unduly heavy for an operator to lift and place it in position on the infeed line 13. The follower 60 shown in this example, for use with standard 12 ounce (355 ml.) beverage cans, is approximately ten pounds, which corresponds to the approximate weight of six full cans.

The configuration and dimensions of the follower 60 enable it to provide force to the terminal infeed can 95, and also allow the follower 60 to travel in its respective lane 94 without binding or catching, particularly in turns. The follower 60 shown in the exemplary embodiment is approximately 5.25 inches high (the approximate height of a can), 8 inches long, and 2.25 inches wide at its widest point (approximately the width of a can).

The follower 60 comprises a body 61 with ends 62a and b, sides 63a and b, a top surface 64 and a bottom surface 65. The ends 62 are configured in a full radius and each has a top edge 66, a bottom edge 67 and an inset middle segment 68. The inset middle segment 68 allows the top and bottom outward edges 66 and 67 to contact the terminal can 95 as it is being selected by a flight bar 51 and further ensures that the flight bar 51 (which is disposed at a height corresponding to that of the segment 68) will not engage the follower 60. Importantly, the midsection of the body 61 is indented on each side so as to form an angle "x" of approximately 141 degrees between the faces of the indented section. This configuration has been found to provide an optimal structure for conveyance in the lane 94. A notch 69 is disposed near the top of each side of the follower 60 to provide a finger hold for the user. A pin 70 is disposed centrally on the top surface 64 of the follower 60. The pin 70 may be screwed, welded or friction fitted in a bore on the top of the follower 60. The bottom surface 65 is preferably partially or completely knurled. The rough surface of the bottom aids in allowing the underlying conveyor to grip the follower 60 and thereby provide back pressure to the downstream cans.

Figures 4, 5, 8, 9, 10:
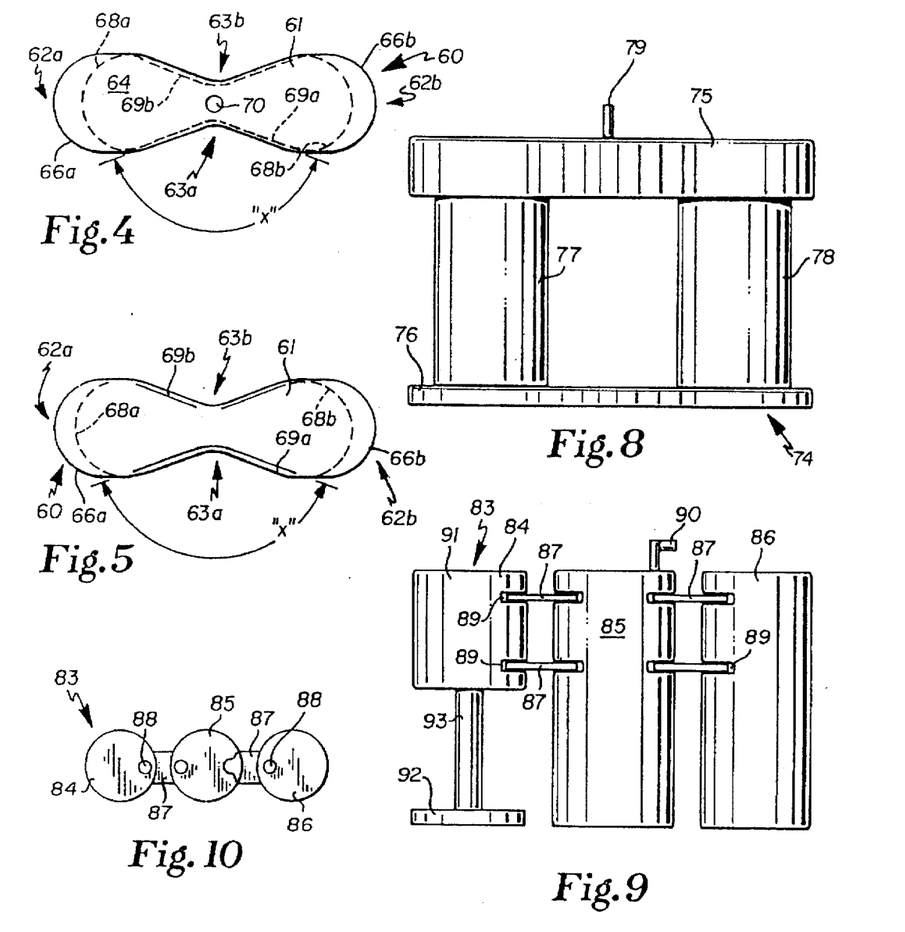
FIG. 4 is a top view of the follower.
FIG. 5 is a crossectional view of the follower taken along line 5—5 of FIG. 3.
FIG. 8 is a side view of an alternative embodiment of the follower.
FIG. 9 is a side view of another alternative embodiment of the follower.
FIG. 10 is a top view of the follower shown in FIG. 9.
Figure 6:
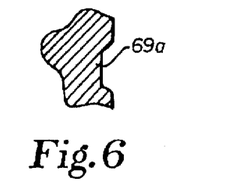
FIG. 6 is a crossectional view of the follower taken along line 6—6 of FIG. 3.

An alternative embodiment of the follower 74 is shown in FIG. 8. The follower 74 is constructed of separate elements which are joined together via screws. The follower 74 comprises top and bottom plates 75 and 76, a pair of cylinders 77 and 78, and a pin 79. The top and bottom plates 75 and 76 have a horizontal profile which is substantially similar to that of the follower embodiment 60, namely a bilaterally symmetrical "bow tie" type configuration with rounded wide ends and a tapered thin middle.

Another alternative embodiment of the follower 83 is shown in FIGS. 9 and 10. This follower 83 is also constructed of joined elements. The follower 83 comprises three cylinders 84, 85 and 86 which are connected by links 87. The links 87 are aligned in slots 89 near the top of each cylinder 84–86 and held in place by pins 88. The cylinders 84–86 independently pivot about the pinned links 87. A top pin 90 extends from the top surface of the center cylinder 85. The first or lead cylinder 84 has top and bottom portions 91 and 92 which are joined by an axially aligned post 93.

Figure 13:
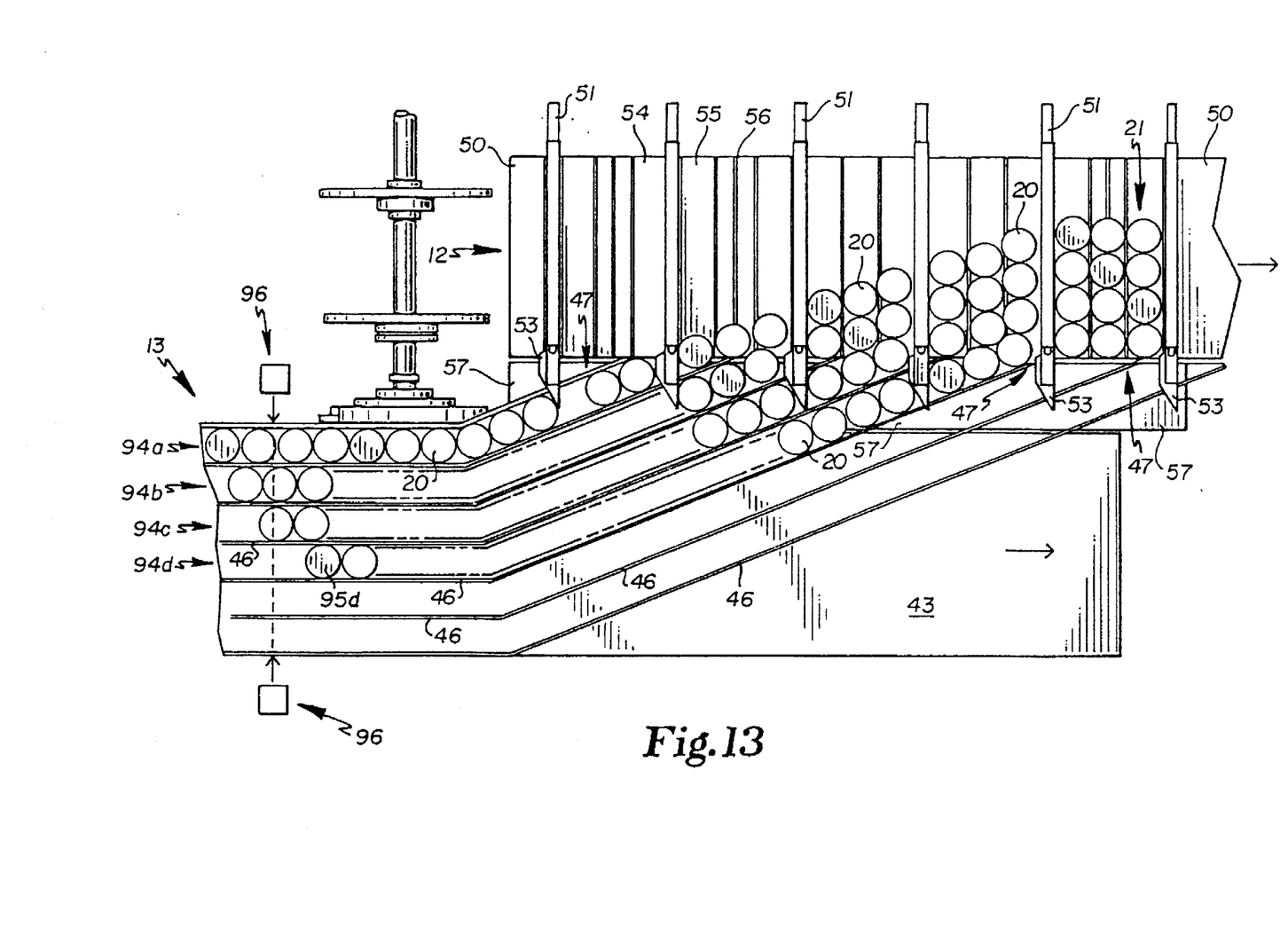
FIG. 13 is a view from the top of the first or low infeed section of the packaging machine showing an exemplary alignment of infeed articles at the initial phase of a clean out condition, wherein the absence of infeed articles in an infeed lane at a predetermined upstream point has been detected.
Figure 14:
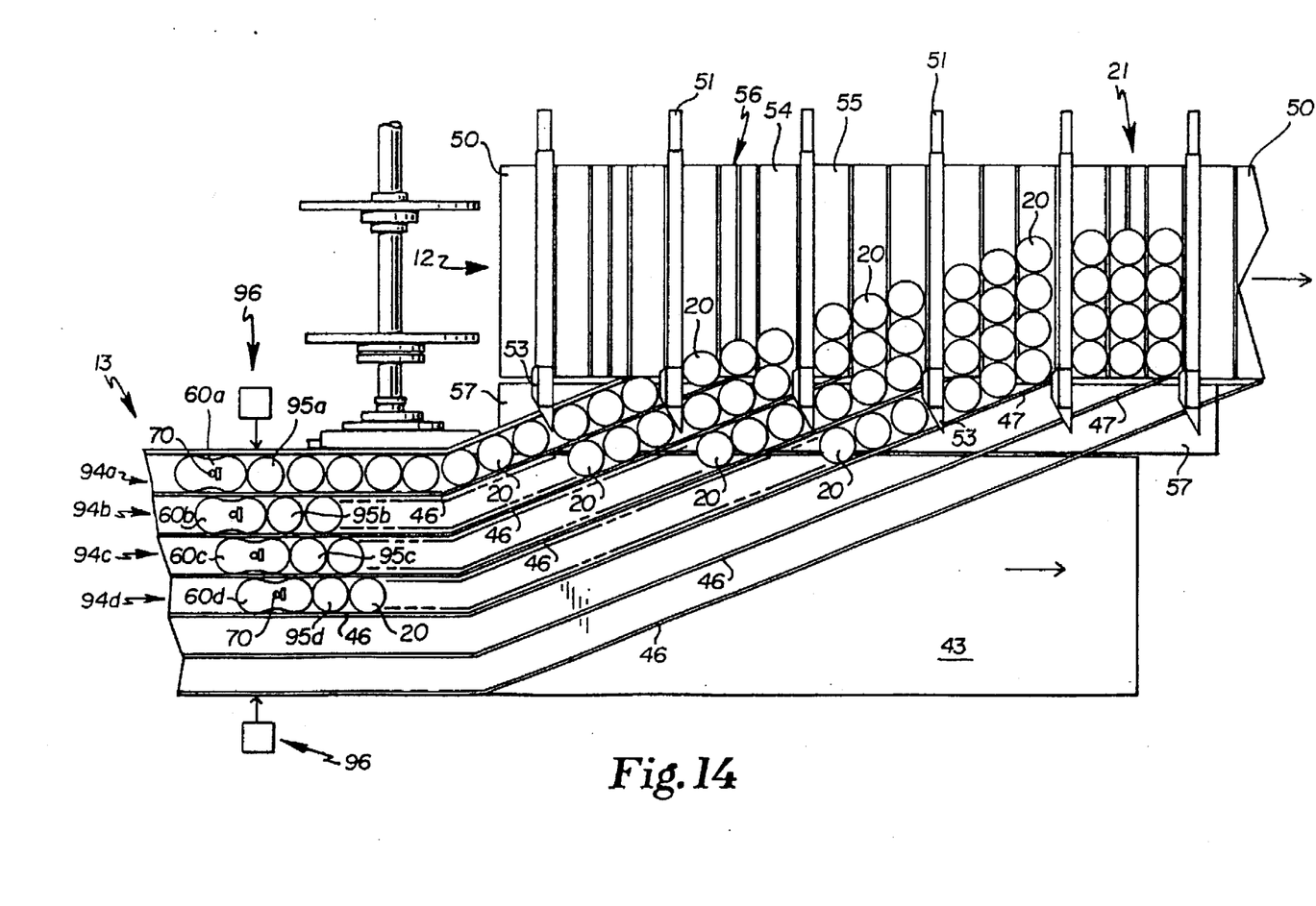
FIG. 14 is a view showing the second phase of a clean out condition, wherein the infeed article stream orientation has been adjusted and a can follower has been placed behind (immediately upstream of) the terminal article in each active lane.
Figure 15:
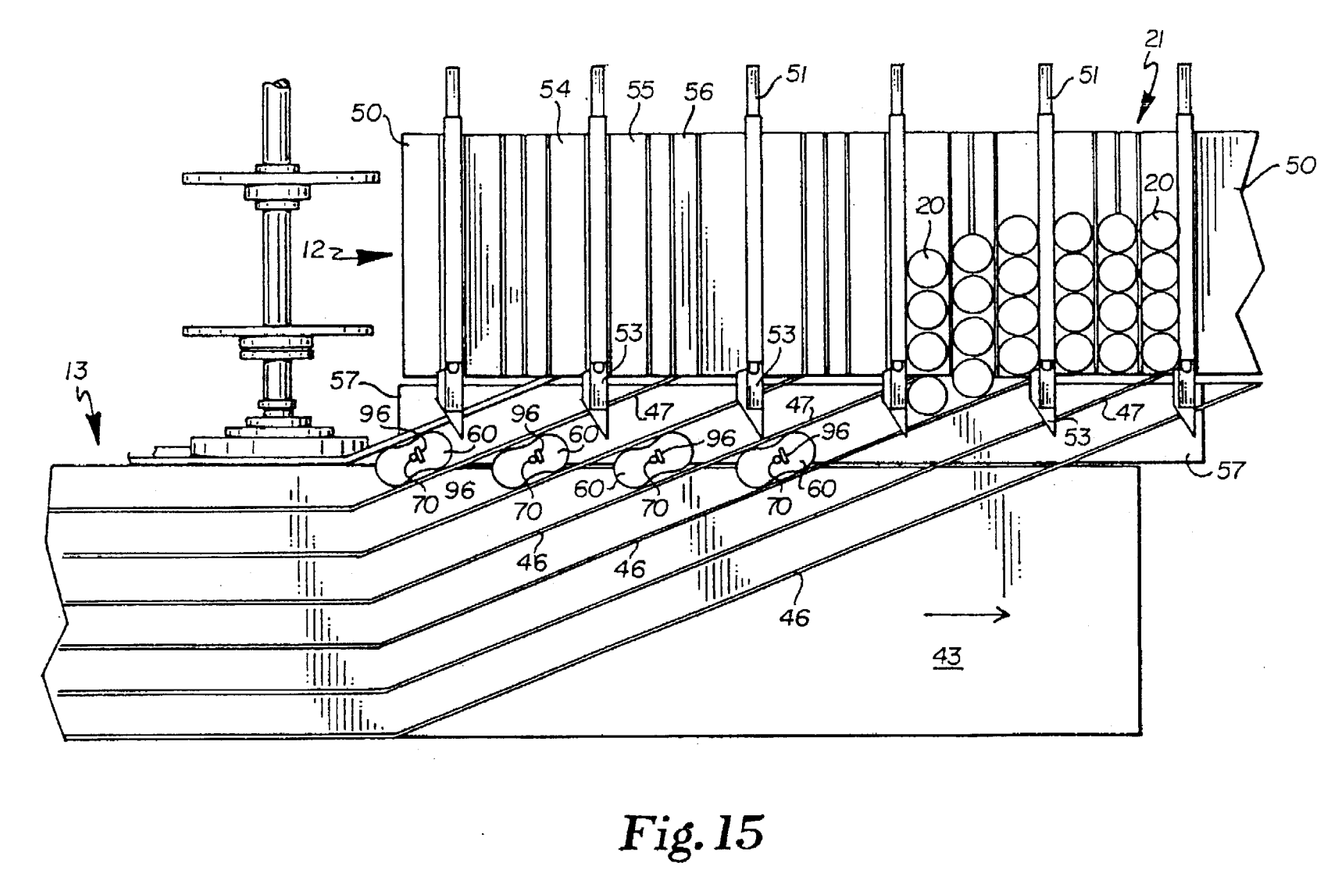
FIG. 15 is a view showing the third phase of a clean out condition, wherein the followers in each lane have reached a terminal position, contacting the follower stop disposed above each lane, and wherein all of the articles in each lane have been raked onto the article group selection and transport line, forming complete article groups thereon, by the action of the flight bars.

A clean out procedure is shown sequentially in FIGS. 13–16. The operator initiates a clean out routine at the control panel 36. The lines 12–16 subsequently begin to run at a slower speed. Cans 20 are shown advancing in infeed line 13, near the selection line 12, in this mode. The infeed lanes are designated 94a–d. Upstream from this position, the supply of cans 20 from ancillary processing apparatus and methods (not shown) is terminated. Infeed continues in this mode until the exhaustion of cans 20 is detected in any single lane 94 at a predetermined point or points near the selection line 12. In FIG. 13, a terminal can 95d is detected in lane 94d by detector 96. Detector 96 may be electromagnetically, optically and/or mechanically based. Various article detection systems are known in the art. At this point, all lines 12–16 are halted, preferably automatically under control by the control system. Referring to FIG. 14, the cans 20 are manually arranged so that terminal cans 95a–d are angled approximately as shown. Manual arrangement at this point on the machine 10 is relatively easy and much safer and quicker than that which is required to manipulate cans at the end of the line 13 or in line 12. The precise angle formed by the terminal cans 95a–d in the line 13 corresponds to the angle and merge distance between the infeed line 13 and the selection line 12. In the preferred embodiment, the lanes 94 are marked so that the proper can alignment is quickly made by the operator. All cans 20 disposed upstream of the terminal cans 95a–d are removed from the line 13. The followers 60a–d are removed from a storage box, preferably disposed near this section of the line 13, and placed immediately adjacent to the corresponding terminal cans 95a–d on the upstream side. This step is performed manually, but it could be accomplished automatically by suitable placement means. Upon completion of this step of the procedure, the operator reactivates the lines 12–16 and the group of cans upstream of and including the terminal cans 95a–d are selected, grouped, transported and loaded into cartons 25. The carton placement mechanism 11 is synchronized to terminate placement of cartons 25 so that all cans 20 and 95 are loaded into cartons 25, with no remaining empty cartons 25.

Figure 16:
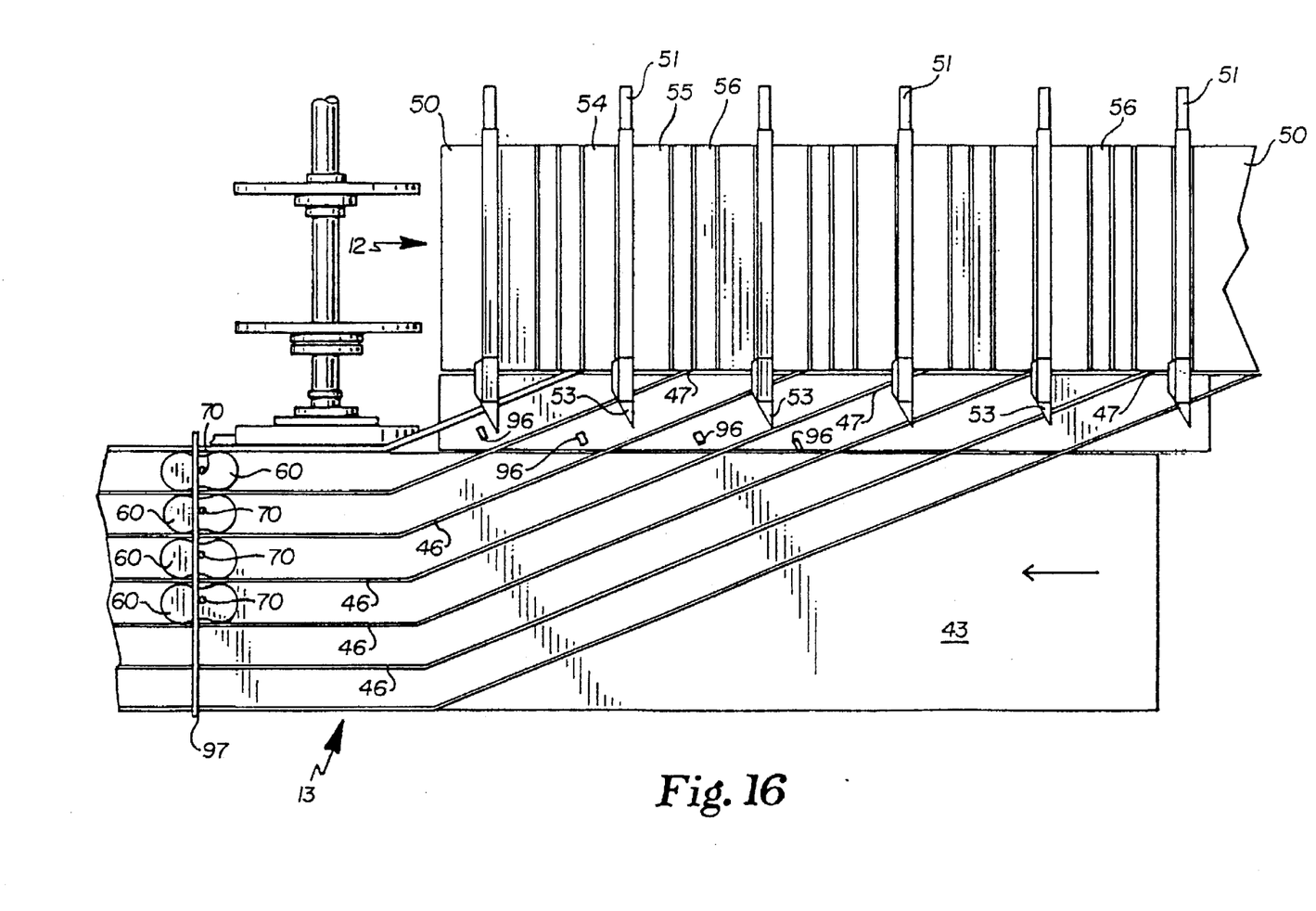
FIG. 16 is a view showing the final phase of the clean out condition, wherein the followers have been returned to a predetermined position for removal from the infeed conveyor.

The followers 60 ensure that all of the cans 20 and 95 are properly selected by the flight bars 51 of the selection line 12. The followers 60 provide sufficient back pressure, in cooperation with the conveyor 43, on the downstream cans 20 and 95 to maintain proper flow across the deadplate 57. The followers 60 prevent formation of gaps between cans. The design of the followers 60 is such that they maintain contact with the terminal cans 59, providing necessary surge pressure thereto, up to the point of their selection by the leading edge of the flights bars 51. The followers 60 are halted at this point by stop members 96. In the preferred embodiment, a stop member 96 is disposed above each lane 94, attached to an overhead frame member 17. The stop member 96 is a rigid structure that extends downwardly for contact with the top post 70 of the follower 60. The stop member 96 prevents the stop post 70 from moving forward further. The positioning of the stop post 96 in each lane 94 is such that the forward edge of the follower 60 stops short of contact with the flight bars 51. Upon selection of the terminal cans 95, the infeed lane conveyor 43 reverses direction, preferably under automatic control, and returns the followers 60 to their original placement position so that the operator can easily remove them from the line 13 and return them to their storage container. As shown in FIG. 16, a stop bar 97 is disposed above the line 13 to halt the rearward movement of the followers 60 at a predetermined point for operator removal.

The procedure described above with respect to the low infeed line 13 is also practiced for the high infeed line 14, simultaneously.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim is expressed as a means or step for performing a specified function it is intended that such claim be construed to cover the corresponding structure, material, or acts described in the specification and equivalents thereof, including both structural equivalents and equivalent structures.

What is claimed is:

1. A method of terminating the operation of a packaging machine of the type having a conveyor based article infeed line having at least one input lane conveying articles to a flight bar based selection line, the method comprising the step of placing a load on a predetermined article traveling in the article input lane at a predetermined point by placing an article follower behind said predetermined article.

2. The method of claim 1, further comprising the steps of:
   (a) terminating the operation of the infeed line conveyor at a predetermined position;
   (b) placing an article follower behind a terminal article in each input lane;
   (c) activating the operation of the infeed line conveyor whereby the articles in each input lane are conveyed to the selection line; and
   (d) halting the conveyance of the article follower in the input lane prior to the selection line, whereby the article follower loads the terminal article and ensures that it is conveyed to the selection line.

3. The method of claim 2, further comprising the step of returning the article follower to an initial placed position.

4. The method of claim 2, wherein there are a plurality of input lanes on the infeed line, and further comprising the step of arranging the orientation of the terminal article in each input lane relative to one another subsequent to said termination step and prior to said placement step.

5. The method of claim 4, wherein the terminal articles are arranged in an predetermined angular orientation with respect to one another.

\* \* \* \* \*